(12) United States Patent
Aiello et al.

(10) Patent No.: US 7,239,477 B2
(45) Date of Patent: Jul. 3, 2007

(54) LOW PROFILE AIR-OIL HYBRID FLUID DYNAMIC BEARING MOTOR

(75) Inventors: Anthony Joseph Aiello, Aptos, CA (US); Paco Gregor Flores, Felton, CA (US); Ali Khurram, Scotts Valley, CA (US); Klaus Dieter Kloeppel, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 72 days.

(21) Appl. No.: 10/702,786

(22) Filed: Nov. 5, 2003

(65) Prior Publication Data

US 2004/0090702 A1 May 13, 2004

Related U.S. Application Data

(60) Provisional application No. 60/424,221, filed on Nov. 5, 2002.

(51) Int. Cl.
  *G11B 17/02* (2006.01)
  *H02K 7/08* (2006.01)

(52) U.S. Cl. .................................. 360/99.08; 310/90
(58) Field of Classification Search .................. None
  See application file for complete search history.

(56) References Cited

U.S. PATENT DOCUMENTS

| | | | |
|---|---|---|---|
| 4,132,414 A | 1/1979 | Dinsdale | |
| 5,328,270 A | 7/1994 | Crawford et al. | |
| 5,347,189 A | 9/1994 | Chuta et al. | |
| 5,423,612 A | 6/1995 | Zang et al. | |
| 5,427,456 A | 6/1995 | Hensel | |
| 5,448,120 A | 9/1995 | Schaule et al. | |
| 5,487,608 A | 1/1996 | Leuthold et al. | |
| 5,516,212 A | 5/1996 | Titcomb | |
| 5,524,986 A | 6/1996 | Leuthold et al. | |
| 5,533,812 A | 7/1996 | Leuthold et al. | |
| 5,577,842 A | 11/1996 | Parsoneault et al. | |
| 5,601,125 A | 2/1997 | Parsoneault et al. | |
| 5,653,540 A | 8/1997 | Heine et al. | |
| 5,678,929 A | 10/1997 | Parsoneault et al. | |
| 5,685,647 A | 11/1997 | Leuthold et al. | |
| 5,716,141 A | 2/1998 | Chen | |
| 5,793,129 A | 8/1998 | Parsoneault et al. | |
| 5,847,479 A | 12/1998 | Wang et al. | |
| 5,908,247 A | 6/1999 | Leuthold et al. | |
| 5,925,955 A | 7/1999 | Norris | |
| 5,940,246 A | 8/1999 | Khan et al. | |
| 5,956,204 A | 9/1999 | Dunfield et al. | |
| 5,969,448 A * | 10/1999 | Liu et al. .................. | 360/99.08 |
| 5,969,903 A | 10/1999 | Parsoneault et al. | |
| 5,977,674 A | 11/1999 | Leuthold et al. | |

(Continued)

*Primary Examiner*—Allen Cao
(74) *Attorney, Agent, or Firm*—Stephen C. Durant; Novak Druce & Quigg LLP (57) ABSTRACT

A short form fluid dynamic bearing motor is provided comprising a stationary shaft attached at a first end to a motor cover, a plate supported on a second end of the shaft, a hub rotatably supported on the shaft, a journal gap defined between an outer diameter of the shaft and an inner diameter of the hub, a fluid bearing in the journal gap, a thrust gap defined between a lower surface of the hub and an upper surface of the plate, and an air (or other gas) bearing in the thrust gap.

20 Claims, 8 Drawing Sheets

U.S. PATENT DOCUMENTS

| | | |
|---|---|---|
| 5,980,113 A | 11/1999 | Grantz |
| 6,019,516 A | 2/2000 | Leuthold et al. |
| 6,055,126 A | 4/2000 | Kennedy et al. |
| 6,065,877 A | 5/2000 | Leuthold et al. |
| 6,118,620 A | 9/2000 | Grantz et al. |
| 6,137,650 A | 10/2000 | Heine et al. |
| 6,144,523 A | 11/2000 | Murthy et al. |
| 6,148,501 A | 11/2000 | Grantz et al. |
| 6,149,159 A | 11/2000 | Kloeppel et al. |
| 6,149,161 A | 11/2000 | Grantz et al. |
| 6,183,135 B1 | 2/2001 | Kloeppel et al. |
| 6,280,088 B1 | 8/2001 | Leuthold et al. |
| 6,285,527 B1 | 9/2001 | Kennedy et al. |
| 6,296,390 B1 | 10/2001 | Wolff et al. |
| 6,296,391 B1 | 10/2001 | Hayakawa et al. |
| 6,402,383 B1 | 6/2002 | Parsoneault et al. |
| 6,575,634 B2 | 6/2003 | Nottingham |
| 6,583,952 B1 | 6/2003 | Grantz et al. |
| 6,594,883 B2 | 7/2003 | Kloeppel et al. |
| 6,982,510 B1 | 1/2006 | Aiello et al. |
| 2004/0208404 A1 | 10/2004 | Dittmer et al. |

* cited by examiner

LOW PROFILE AIR-OIL HYBRID FLUID DYNAMIC BEARING MOTOR

CROSS REFERENCE TO RELATED APPLICATIONS

This application claims the priority of U.S. Provisional Application Ser. No. 60/424,221, filed Nov. 5, 2002, by Aiello et al. (entitled "Low Profile Air-Oil Hybrid FDB"), which is herein incorporated by reference.

FIELD OF THE INVENTION

The present invention relates generally to fluid dynamic bearing motors, and relates more specifically to small form factor fluid dynamic bearing motors having limited journal spans.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Over the years, storage density has tended to increase, and the size of the storage system has tended to decrease. This trend has lead to greater precision and lower tolerance in the manufacturing and operating of magnetic storage disks.

The bearing assembly that supports the storage disk is of importance. One bearing design is a fluid dynamic bearing. In a fluid dynamic bearing, a lubricating fluid such as air or liquid provides a bearing surface between a fixed member of the housing and a rotating member of the disk hub. In addition to air, typical lubricants include gas, oil or other fluids. The relatively rotating members comprise fluid dynamic grooves formed on the members themselves. Fluid dynamic bearings spread the bearing surface over a large surface area, as opposed to a ball bearing assembly, which comprises a series of point interfaces. This bearing surface distribution is desirable because the increased bearing surface reduces wobble or run-out between the rotating and fixed members. Further, the use of fluid in the interface area imparts damping effects to the bearing, which helps to reduce non-repeatable run-out. Thus, fluid dynamic bearings are an advantageous bearing system.

Many current fluid dynamic bearing motor designs used in small form factor drives—that is, drives with stringent axial height constraints—suffer from insufficient angular stiffness due to the limited journal space available for journal bearing span. It is well known in the art that angular stiffness is a function of linear stiffness (i.e., radial stiffness in the journal bearing and axial stiffness in the thrust bearing) times a moment arm length (i.e., journal bearing span and thrust bearing diameter). Angular stiffness shortcomings therefore have traditionally been countered by employing a large diameter thrust bearing (i.e., increasing the moment arm length—or thrust bearing diameter—for axial stiffness) to augment the total bearing angular stiffness in cases where increasing the journal span is not possible. However, increasingly stringent power requirements in small disk drives make this option less efficient from a power standpoint. More specifically, large diameter thrust bearings consume relatively large amounts of power because the drag of a thrust bearing is proportional to the $4^{th}$ power of the bearing's radius, and the bearing fluid employed in those thrust bearings oftentimes is a liquid having a relatively high viscosity.

Thus, there is a need in the art for an efficient small form factor fluid dynamic bearing motor having improved angular stiffness.

SUMMARY OF THE INVENTION

In one embodiment, a short fluid bearing journal is utilized. The short fluid (e.g., liquid) bearing journal is combined with a large air bearing thrust journal in order to achieve a design exhibiting highly efficient angular stiffness.

A short form factor fluid dynamic bearing motor comprising a stationary shaft attached at a first end to a motor cover, a plate supported on a second end of the shaft, a hub rotatably supported on the shaft, a journal gap defined between an outer diameter of the shaft and an inner diameter of the hub, a fluid bearing in the journal gap, a thrust gap defined between a lower surface of the hub and an upper surface of the plate and an air bearing in the thrust gap.

In another embodiment, a motor with highly efficient angular stiffness in a small form factor envelope is achieved by using an unusually short fluid bearing journal that is well aligned with the rotor center of gravity for maximum effectiveness in combination with an air bearing thrust located on the bottom surface of the hub such that thrust surface area and moment arm are maximized. The primary alignment surface is the thrust bearing, and the journal bearing is typically crowned to enable this. Sensitivity to journal-thrust perpendicularity is much lower with journal crowning since misalignment is converted into the horizontal position of the thrust bearing. The journal can be a downward-angled conical design or vertically oriented when used with a magnetic bias force typically provided by an axial magnet-stator offset. The vertically oriented version may require an overlapping shoulder part to limit axial displacement under shock conditions. Provisions are made to attach the shaft to the top cover for improved structural stiffness. The air bearing thrust includes at least one surface of wear-resistant material or coating and is partially lubricated for improved start-stop performance by an adjacent journal capillary seal for which the thrust bearing acts as an oil evaporation labyrinth.

In another embodiment, a short form factor fluid dynamic bearing motor comprises a stationary shaft coupled at a first end to a motor, a plate supported on a second end of the shaft, a hub rotatably supported on the shaft, a journal gap defined between an outer diameter of the shaft and an inner diameter of the hub, a liquid-lubricated bearing in the journal gap, a thrust gap defined between a lower surface of the hub and an upper surface of the plate, an air bearing in the thrust gap, bearing grooves formed on at least one of the outer diameter of the shaft and the inner diameter of the hub, and bearing grooves formed on at least one of the lower surface of the hub and an upper surface of the plate.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
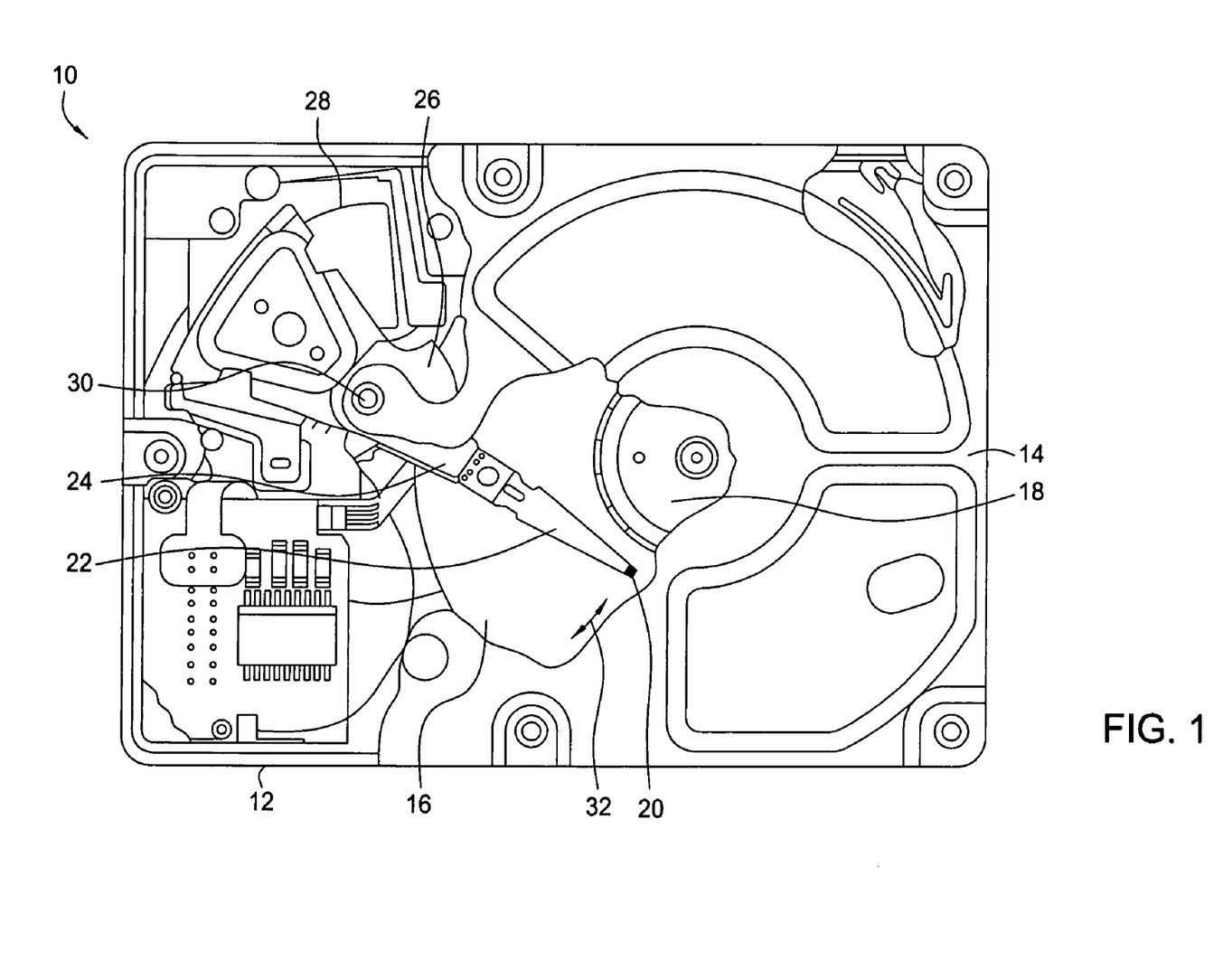
FIG. 1 depicts a plan view of one embodiment of a disk drive that comprises a motor in which the invention is used.

FIG. 1 depicts a plan view of one embodiment of a disk drive 10 for use with embodiments of the invention. Referring to FIG. 1, the disk drive 10 includes a housing base 12 and a top cover plate 14. The housing base 12 is combined with cover plate 14 to form a sealed environment to protect the internal components from contamination by elements outside the sealed environment. The base and cover plate arrangement shown in FIG. 1 is well known in the industry; however, other arrangements of the housing components have frequently been used, and aspects of the invention are not limited by the particular configuration of the disk drive housing. The disk drive 10 further includes a disk pack 16 that is mounted on a spindle motor (not shown) for rotation on the spindle motor by a disk clamp 18. The disk pack 16 includes one or more of individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor, shown generally at 28. The voice coil motor 28 rotates actuator 26 with its attached read/write heads 20 about a pivot shaft 30 to position read/write heads 20 over a desired data track along a path 32.

Figure 2:
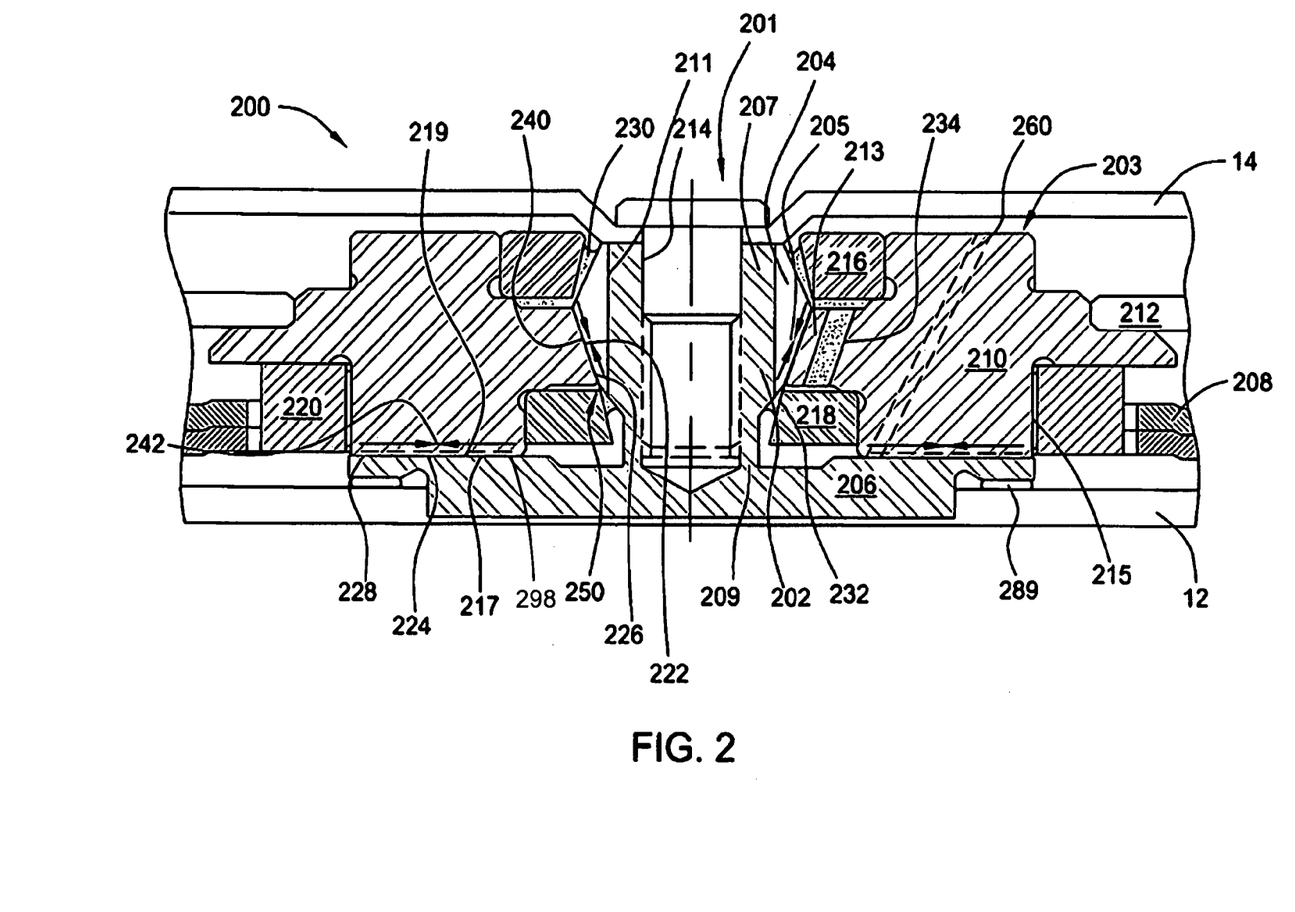
FIG. 2 depicts a side sectional view of one embodiment of a fluid dynamic bearing motor according to the present invention.

FIG. 2 illustrates a side sectional view of one embodiment of a fluid dynamic bearing motor 200. The motor 200 comprises a stationary assembly 201, a rotating assembly 203 and a bearing assembly 205.

The stationary assembly 201 comprises a shaft 202 having a first end 207 and a second end 209. The first end 207 is preferably coupled to a cover 14, for example, by using a screw or other fastener as shown. Coupling to the cover 14 significantly improves structural system stiffness while compromising little axial space. The second end 209 is supported from a base 12 and is coupled to or integrated with an annular plate 206. The annular plate 206 may be formed integrally with the shaft 202, as shown in FIG. 2, or may be a separate piece coupled (by press-fitting for example) to the second end 209 of the shaft 202 (see, e.g., FIG. 4). The annular plate 206 can be attached to the base 12 at area 289 using pressure sensitive adhesive (PSA) over a large surface area to enhance shear strength and structural stiffness in the motor 200. However, attachment may also be accomplished by epoxy or other attachment devices.

A conical bearing element 204 may optionally be coupled to an outer diameter of the shaft 202, proximate the first end 207. The conical bearing element 204 may be a separate piece coupled (by press-fitting for example) to the shaft 202, as shown in FIG. 2, or may be formed integrally with the shaft 202 (see, e.g., FIG. 4). A stator 208 is supported on the base 12 and comprises a plurality of "teeth" formed of a magnetic material (for example, steel) and wound with a winding or wire.

The rotating assembly 203 comprises a hub 210 rotatably supported on the shaft 202. The hub 210 supports one or more disks 212 for rotation. A bore 214 is formed through the hub 210 for receiving the shaft 202. First and second annular seal rings 216, 218 are pressed into the hub 210 proximate the first and second ends 207, 209 of the shaft 202, respectively. Note that the second seal ring 218 extends toward the shaft 202 so that an overlap 250 is created with the conical bearing element 204 to limit axial displacement under shock. A magnet 220 is mounted to the outer diameter 215 of the hub 210 and cooperates with the stator 208 to induce rotation of the hub 210 about the shaft 202.

The bearing assembly 205 comprises a fluid bearing 222 and an air bearing 224. The fluid bearing 222 is formed in a journal gap 226 defined between the stationary 201 and rotating 203 assemblies. Specifically, the journal gap 226 is defined between the facing surfaces of the inner diameter 213 of the hub 210 and the outer surface 211 of the conical bearing element 204, which is attached to shaft 202. The journal gap 226 is filled with a fluid such as oil that helps to support the relative rotation of the shaft 202 and hub 210. At least one of the surfaces 211, 213 bounding the journal gap 226 comprises bearing grooves (indicated in FIG. 2 by opposing arrows) that help to circulate the fluid and generate hydrodynamic pressure in the journal gap 226.

The air bearing 224 is formed in a thrust gap 228 defined between the stationary 201 and rotating 203 assemblies. Specifically, the thrust gap 228 is defined between an upper surface 217 of the plate 206 and a lower surface 219 of the hub 210. The thrust gap 228 is filled with air that helps support the relative rotation of the shaft 202 and hub 210. At least one of the surfaces 217, 219 bounding the thrust gap 228 comprises bearing grooves (indicated in FIG. 2 by opposing arrows and illustrated in further detail in FIGS. 3A and 3B) that help to circulate the air and generate pressure in the thrust gap 228. In addition, at least one of the surfaces 217, 219 may comprise a wear-resistant material or coating 298 (for example, a diamond-like coating). In one embodiment, a wear-resistant coating is provided on a thrust surface defined by the thrust gap. In another embodiment, a resilient self-aligning pad is provided on a thrust surface defined by the thrust gap.

The bearing assembly 205 further comprises a first capillary seal 230 located proximate the first end 207 of the shaft 202 and a second capillary seal 232 located proximate the second end 209 of the shaft 202. In the embodiment illustrated in FIG. 2, the first capillary seal 230 is a centrifugal capillary seal defined between the diverging surfaces of the conical bearing element 204 and the first annular ring 216. The second capillary seal 232 also is a centrifugal capillary seal defined between the diverging surfaces of the second end 209 of the shaft 202 and the second sealing ring 218. The second capillary seal 232 also serves to partially lubricate at least one surface 217, 219 in the thrust gap 228, and conversely, the thrust gap 228 acts as an oil evaporation labyrinth for the second capillary seal 232. At least one fluid recirculation channel 234 extends through the hub 210 and connects the upper and lower ends of the journal gap 226. By so positioning the recirculation channel 234, any net fluid flow in the bearing assembly 205 that is induced by form tolerances (such as bore and/or shaft taper) will insulate (isolate) the seals 230, 232 from turbulence and pressure gradients, which can either pump the seals dry or cause them to overflow.

Persons skilled in the art will appreciate that the first and second sealing rings 216, 218 may be pressed onto the shaft 202 rather than the hub 210. In such a case, the capillary seals 230, 232 would be relocated to a space between the hub 210 and the outer diameters of the sealing rings 216, 218.

Figure 3A:
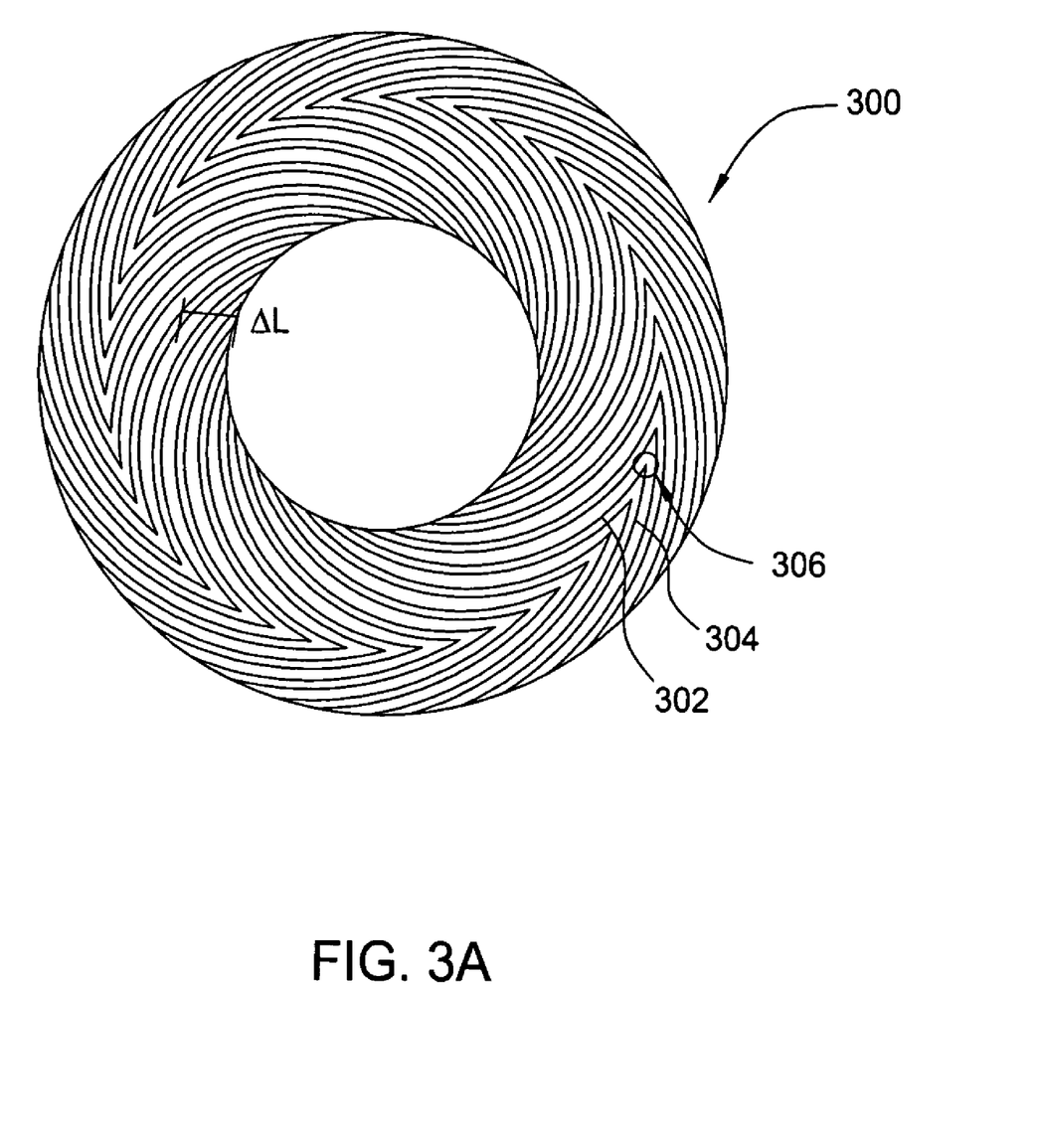
FIG. 3A illustrates a set of bearing grooves for use with embodiments of the present invention.
Figure 3B:
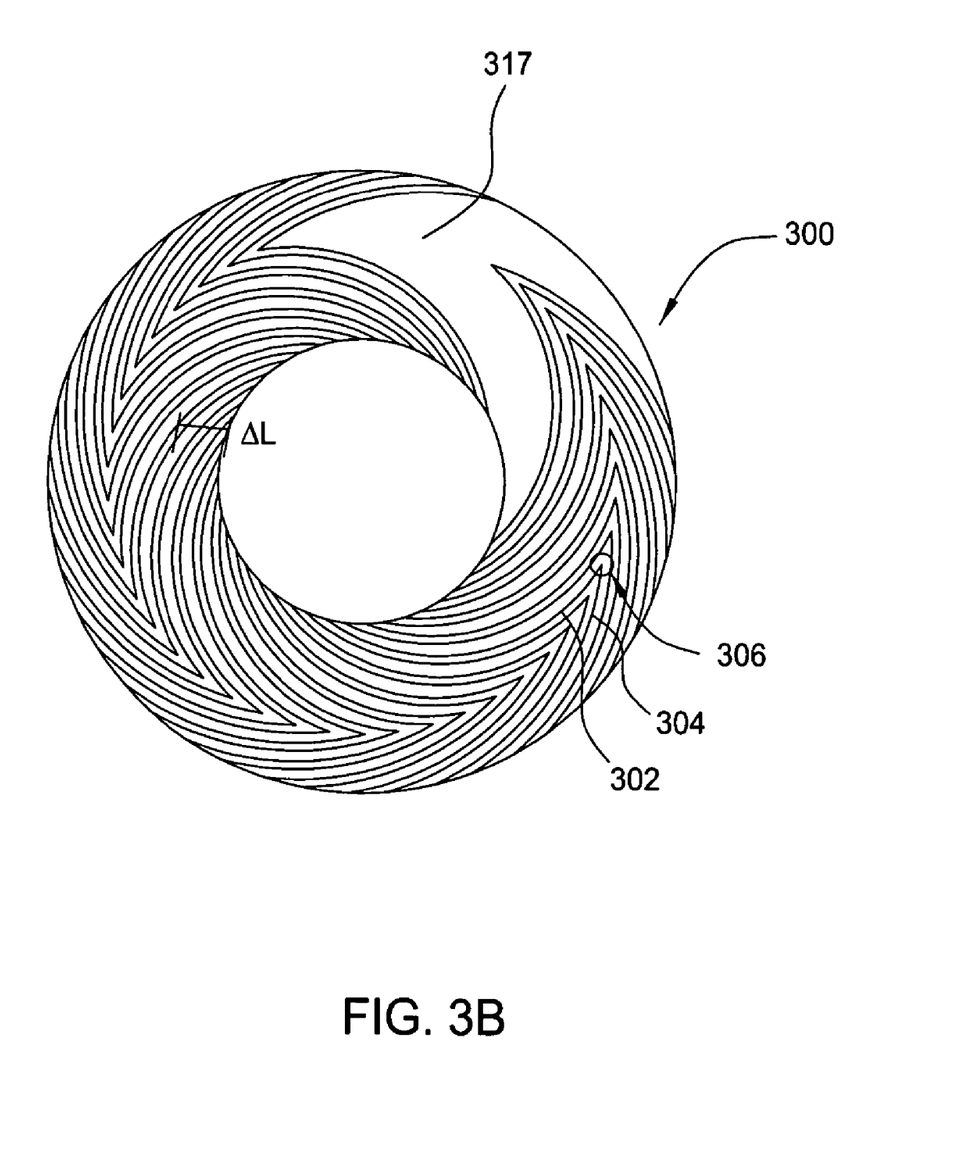
FIG. 3B illustrates another embodiment of a set of bearing grooves for use with embodiments of the present invention.

The bearing grooves formed in the thrust gap 228 are illustrated in greater detail in FIGS. 3A and 3B. In one embodiment, the grooves 300 are chevron grooves that form a ring around the grooved surface (for example, on the upper surface 217 of the plate 206 and/or the lower surface 219 of the hub 210). The grooves 300 comprise first and second segments, 302 and 304, respectively, that meet at an apex 306. Each segment 302, 304 pumps fluid or air towards the apex 306, where fluid or air pressure is built. If the length of one segment 302, 304 exceeds that of the other (as illustrated, where the length of the first segment 302 is greater than the length of the second segment 304 by a difference of ΔL), the apex 306 location will be shifted and a net flow of fluid or air will pump in one direction, toward the shorter segment (i.e., the second segment 304).

Referring back to FIG. 2, the apexes 240, 242 of the fluid and air bearings 222, 224, respectively, are located at the points where the arrows indicating the bearing grooves meet (with each arrow in a set representing a groove segment and its pumping direction).

Moreover, FIG. 3B illustrates an optional deeper channel 317 to facilitate venting pressurized air or enforcing ambient pressure at the thrust bearing inner diameter. The channel 317 can be oriented through a portion of a thrust gap surface. Among other things, such a design can help prevent fluid losses from the journal.

Note in FIG. 2 that the air bearing 224 formed in the thrust gap 228 is relatively large when compared with the size of the fluid bearing 222 formed in the journal gap 226. That is, the moment arm (i.e., the diameter) of the air bearing 224 in the thrust gap 228 is much greater than the moment arm (i.e., the length) of the fluid bearing 222 in the journal gap 226. The increased moment arm length in the thrust gap 228 results in improved angular stiffness in the bearing assembly 205. Furthermore, because the moment arm is increased in the thrust gap 228 rather than the journal gap 226, increased angular stiffness is achieved without increasing the overall axial height of the motor. The disclosed design thus optimizes stiffness relative to the special constraints of motors having short axial heights. In addition, using air or gas in the large thrust gap 228, as opposed to a liquid such as oil, decreases viscous losses, resulting in high angular stiffness without consuming an inordinate amount of power. The design also provides the benefits of damping associated with having at least one liquid filled journal bearing.

Efficiency is further served by aligning the short fluid bearing 222 in the journal gap 226 with the center of gravity of the rotating assembly 203. Persons skilled in the art will recognize that such a configuration reduces the moments resulting from any forces acting on the rotating assembly 203 in the radial direction, thereby increasing overall motor stability. Also, the bearings 222, 224 in the journal gap 226 and thrust gap 228 are maintained substantially perpendicular to each other during motor operation. Since the primary alignment surface is the thrust gap 228, substantially perpendicular alignment is achieved by integrating the annular plate 206 in the thrust gap 228 with the shaft 202. Crowning (i.e., curvature of one or both surfaces defining the gap) of the journal gap 226 is an option that can be implemented in order to absorb misalignment of the journal gap 226 to the thrust gap 228.

In addition, the overlap 250 created by the second sealing ring 218 and the conical bearing element 204 limits axial travel of the rotating assembly 203 relative to the stationary assembly 201 under shock conditions. Axial displacement of the hub 210 relative to the shaft 202 may also be countered by a magnetic bias force. The magnetic bias force may be produced, for example, by axially offsetting the stator 208 relative to the magnet 220.

Figure 4:
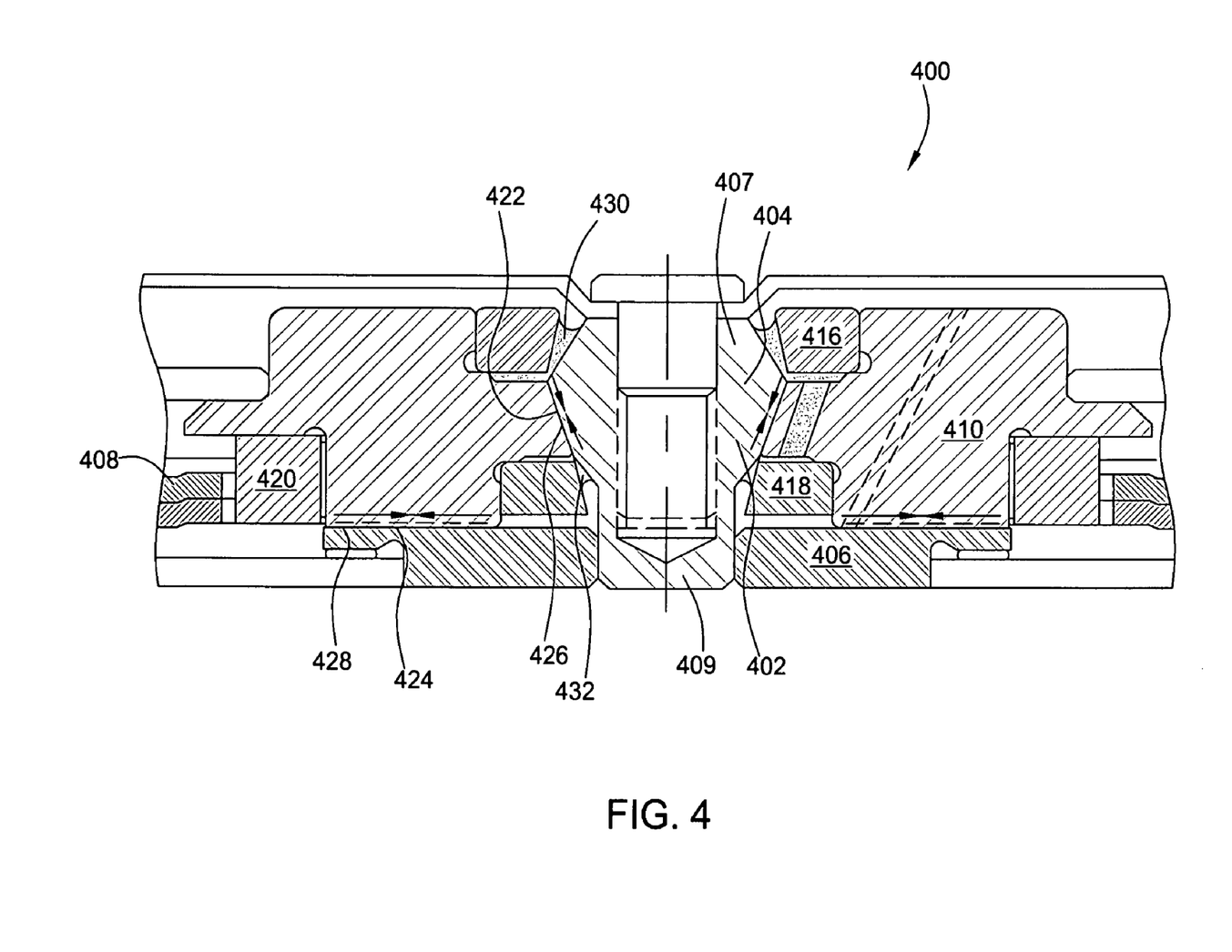
FIG. 4 illustrates a side sectional view of another embodiment of a fluid dynamic bearing motor according to the present invention.

FIG. 4 illustrates a second embodiment of the present invention in which the motor 400 is configured slightly differently than the motor 200 in FIG. 2. In a second embodiment, the conical bearing surface 404 is formed integrally with the first end 407 of the shaft 402, rather than being mounted on as a separate piece (as in FIG. 2). Further, the plate 406 is a separate piece that is mounted (for example by press-fitting) onto the second end 409 of the shaft 402, rather than being formed integrally with the shaft 402 (as in FIG. 2). Again, crowning the journal gap 426 helps align the bearings 422, 424 in the journal and thrust gaps 426, 428.

As persons skilled in the are will understand, the journal gap 426 biases the hub 410 downward such that electromagnetic (or simply magnetic) bias is not needed. Optional electromagnetic bias may be added to enable landing on a journal or a thrust, depending on which is more favorable for wear performance. In this embodiment, downward biasing of the hub 410 is supplied by the axial component of the dynamic pressure force in the journal gap 426. Thus, no stator 408/magnet 420 offset is necessary; however, such an offset still may be employed to bias the hub 410 during start-stop conditions such that either the fluid 422 or air 424 bearing is favored during landing and liftoff. Wear performance should be considered.

Figure 5:
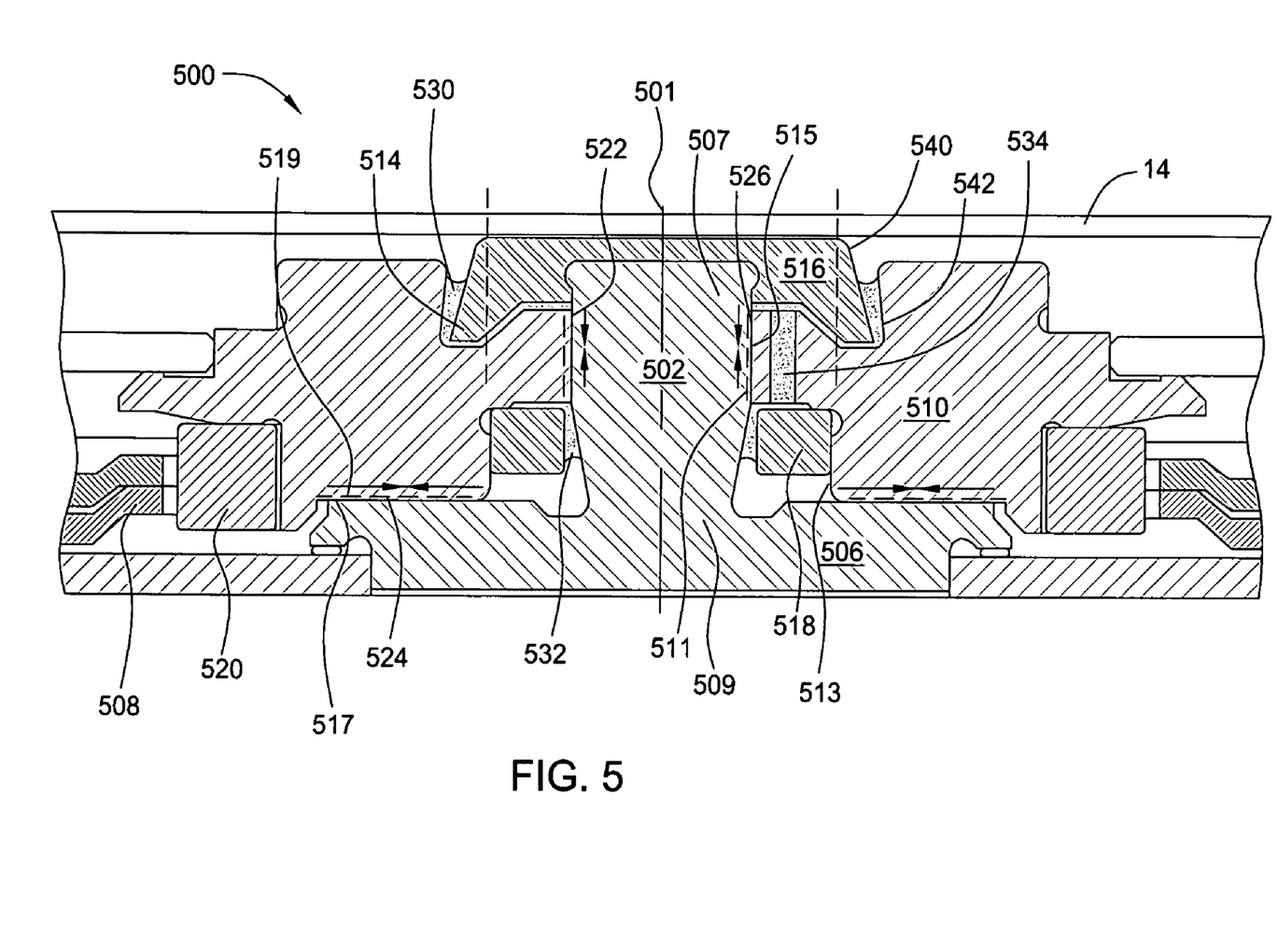
FIG. 5 illustrates a side sectional view of another embodiment of a fluid dynamic bearing motor according to the present invention.
Figure 6:
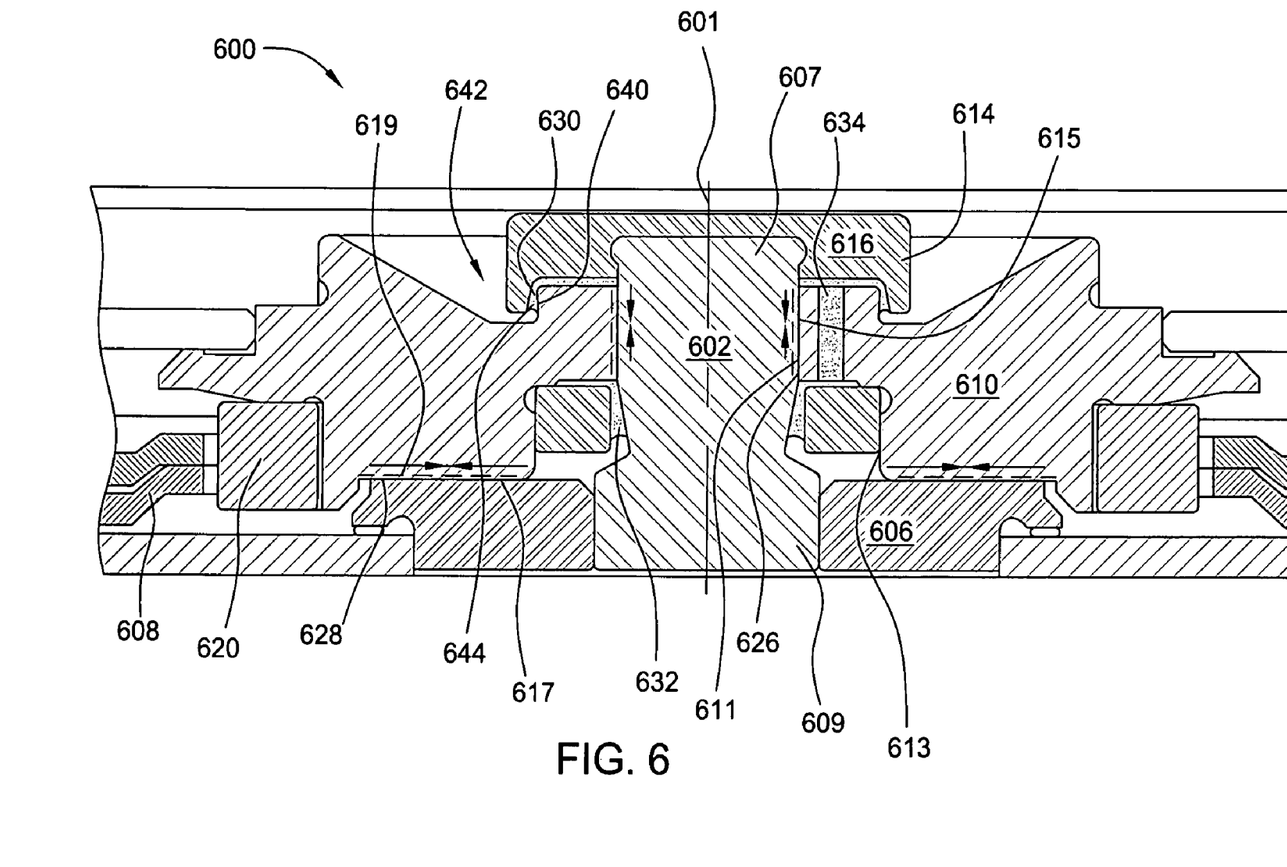
FIG. 6 illustrates a side sectional view of another embodiment of a fluid dynamic bearing motor according to the present invention.

Another embodiment of the present invention is illustrated in FIG. 5. A hub 510 is rotatably supported upon a stationary shaft 502. The shaft 502 also supports an annular plate 506 formed integrally with an end 509 of the shaft 502 below the hub (however, the plate 506 may comprise a separate piece mounted to the shaft 502, as shown in FIG. 6). A first sealing surface comprises a cap 516 coupled to the first end 507 of the shaft 502. The cap 516 comprises a substantially disk-shaped surface with a circumferential rim 514 that extends downward toward the second end 509 of the shaft 502. The rim 514 is angled with respect to the longitudinal axis 501 of the shaft 502 such that an angle, θ, is created between the outer surface 540 of the rim 514 and the shaft's longitudinal axis 501. The cap 516 extends radially into an annular recess 542 defined in the hub 510, proximate the first end 507 of the shaft 502. A second sealing surface comprising a sealing ring 518 is attached to a first inner diameter 513 of the hub 510.

A journal gap 526 is defined between the shaft's outer diameter 511 and a second inner diameter 515 of the hub 510. Unlike the shaft 202 illustrated in FIG. 2, the shaft 502 is a substantially cylindrical member having no additional bearing surfaces in the journal area such as the conical bearing element 204 in FIG. 2. Thus the journal gap 526 is substantially parallel to the motor's spin axis 501. Bearing grooves are formed on at least one of the surfaces defining the journal gap 526, and a fluid is retained therebetween in the gap 526.

A thrust gap 528 is defined between a lower surface 519 of the hub 510 and an upper surface 517 of the plate 506. Bearing grooves such as those illustrated in FIG. 3A or 3B are formed on at least one of the surfaces 517, 519 defining the thrust gap 528, and air is retained therebetween in the gap 528.

A first capillary seal 530 is located proximate the first end 507 of the shaft 502, and a second capillary seal 532 is located proximate the second end 509 of the shaft 502. In the embodiment illustrated in FIG. 5, the first capillary seal 530 is a centrifugal capillary seal defined between the diverging surfaces of outer surface 540 of the cap 516 and the recess 542 in the hub 510. The second capillary seal 532 is a reversed centrifugal capillary seal defined between the diverging surfaces of the second end 509 of the shaft 502 and the second annular seal ring 518. The capillary seals 530, 532 are connected by at least one fluid recirculation channel 534, which extends through the hub 510. By so positioning the recirculation channel 534, any net fluid flow in the bearing assembly that is induced by form tolerances (such as bore and/or shaft taper) will insulate the seals 530, 532 from turbulence and pressure gradients, which can either pump the seals dry or cause them to overflow. Further, the capillary seals 530, 532 cooperate with the recirculation channel 534 to purge air from the bearing fluid.

In the embodiment illustrated, an axial bias force (for example, created by a stator 508/magnet 520 offset) may be needed to counterbalance the thrust bearing force lifting the hub 510. As persons skilled in the art will recognize, alignment of the bearings 522, 524 is improved by forming both bearings 522, 524 along the one integral component comprising shaft 502 and plate 506. Thus the need for journal crowning may be reduced or eliminated.

It should also be appreciated that the advantages of incorporating the cap 516 are threefold. First, as described above, it serves to define the centrifugal capillary seal 530 with the hub 510. Second, the cap 516 acts to limit axial shock displacement of the hub 510 relative to the shaft 502. Third, the cap 516 may be attached to the cover 14 using PSA over a large surface area, enhancing the structural stiffness in the motor 500. However, attachment may also be accomplished by epoxy or other attachment devices.

Another embodiment of a fluid dynamic bearing motor 600 is illustrated in FIG. 6. In this embodiment, the motor 600 is configured similarly to the motor 500 illustrated in FIG. 5. However, unlike in FIG. 5, the motor 600 features an annular plate 606 comprising a separate piece that is mounted, for example by press-fitting, onto a second end 609 of the shaft 602, below the hub 610.

A first sealing surface comprises a cap 616 coupled to the first end 607 of the shaft 602. The cap 616 comprises a substantially disk-shaped surface with a circumferential rim 614 that extends downward toward the second end 609 of the shaft 602. Unlike the rim 514 on the cap 516 illustrated in FIG. 5, the rim 614 is oriented substantially parallel to the shaft 602. The cap 616 extends radially into an angular, annular recess 642 defined in the hub 610, proximate the first end 607 of the shaft 602. The recess 642 slopes upward as it extends radially outward away from the shaft 602. A second sealing surface comprising a sealing ring 618 is attached to a first inner diameter 613 of the hub 610.

A journal gap 626 is defined between the shaft's outer diameter 611 and a second inner diameter 615 of the hub 610. The shaft 602 is a substantially cylindrical member. Thus the journal gap 626 is substantially parallel to the motor's spin axis 601. Bearing groove are formed on at least one of the surfaces defining the journal gap 626, and a fluid is retained therebetween in the gap 626.

A thrust gap 628 is defined between a lower surface 619 of the hub 610 and an upper surface 617 of the plate 606. Bearing grooves such as those illustrated in FIGS. 3A or 3B are formed on at least one of the surfaces 617, 619 defining the thrust gap 628.

A first capillary seal 630 is located proximate the first end 607 of the shaft 602, and a second capillary seal 632 is located proximate the second end 609 of the shaft 602. In the embodiment illustrated in FIG. 6, the first capillary seal 630 is a reverse centrifugal capillary seal defined between the diverging surfaces of an inner surface 640 of the cap 616 and an inner surface 644 of the recess 642 in the hub 610. The second capillary seal 632 is centrifugal capillary seal defined between the diverging surfaces of the second end 609 of the shaft 602 and the annular seal ring 618. The capillary seals 630, 632 are connected by at least one fluid recirculation channel 634, which extends through the hub 610. By so positioning the recirculation channel 634, any net fluid flow in the bearing assembly that is induced by form tolerances (such as bore and/or shaft taper) will insulate the seals 630, 632 from turbulence and pressure gradients, which can pump either seal dry or cause one to overflow. Further, the capillary seals 630, 632 cooperate with the recirculation channel 634 to allow air to be purged from the bearing fluid In the embodiment illustrated, an axial bias force (for example, created by a stator 608/magnet 620 offset) may be needed to counterbalance a thrust bearing force that acts to lift the hub 610.

Figure 7:
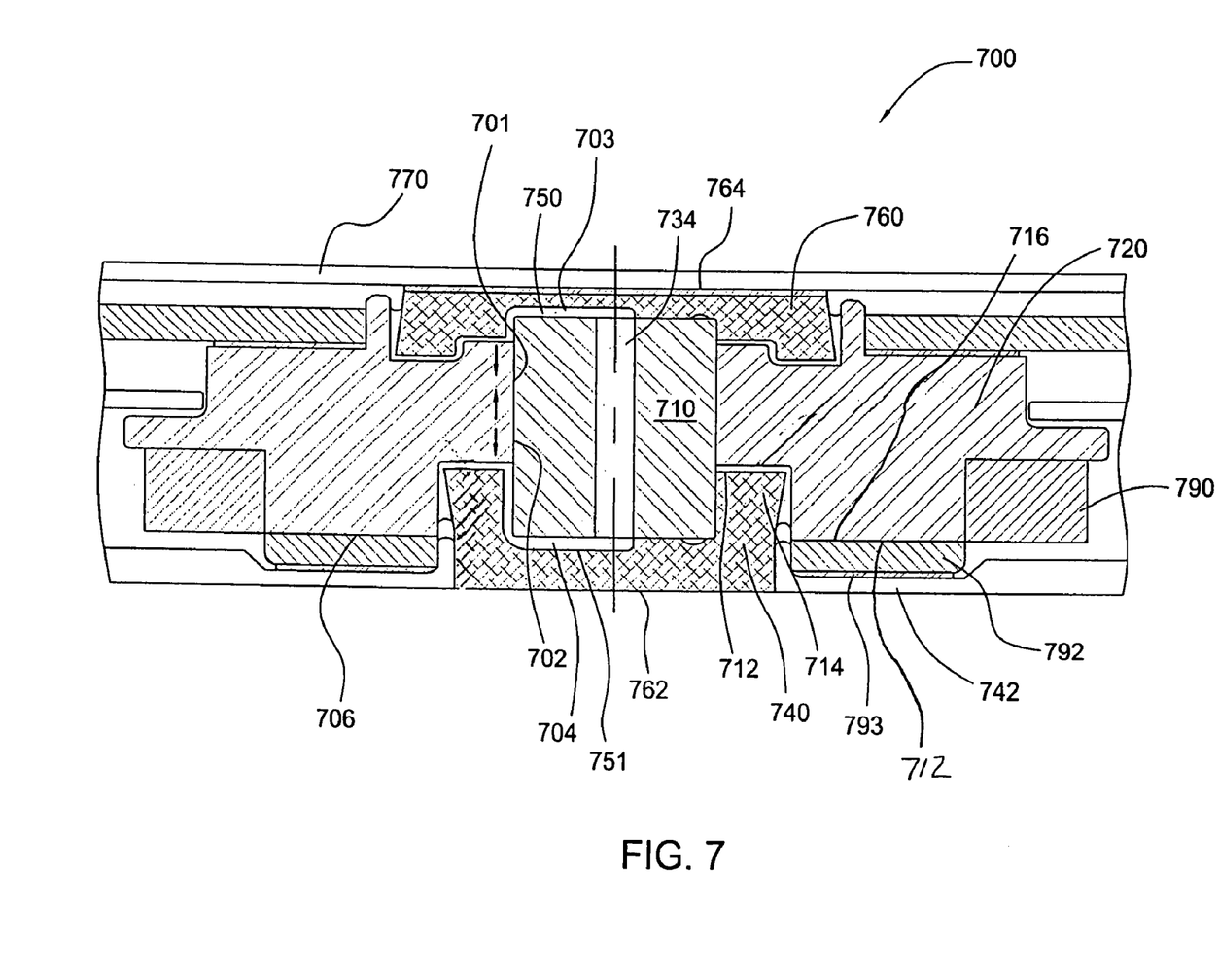
FIG. 7 illustrates a side sectional view of another embodiment of a fluid dynamic bearing motor according to the present invention.

FIG. 7 illustrates another alternative embodiment of a fluid dynamic bearing motor 700. In FIG. 7, journal bearings 701 and 702 are provided to establish radial support, and a thrust bearing 706 is provided at at least one end of the shaft 710 between the axial surface 712 of the thrust plate 792 and a facing axial surface 716 of hub 720 to establish axial support. Rather than provide for a recirculation channel through the hub, in this embodiment the recirculation channel 734 extends axially through the shaft 710. In addition, radial portions 703, 704 of the overall recirculation path may then be defined between the shaft 710 and a grooved section 750 of an upper plate 760 and a grooved section 751 of a lower plate 740, respectively. (Persons skilled in the art will recognize that in alternative embodiments shaft 710 may include the grooved sections that comprise the radial portions 703, 704 of the recirculation path.) In such a configuration, the overall recirculation path is stationary rather than moving such that the circulation path is not subjected to centrifugal forces.

As FIG. 7 also shows, compliant material 793 is disposed between thrust plate 792 and base 742. As persons skilled in the art will appreciate, compliant material 793 enables thrust plate 792 to align itself with hub 720. In this manner, the design accommodates any misalignments between the journal and thrust bearings that can be adverse to maintaining uniform bearing gaps. In other embodiments, crowning may be used in combination with or in lieu of compliant material 793 to achieve desired alignment of the journal and thrust bearings.

In this embodiment as well as the previously described embodiments, the motor attachment to the base 742 and top cover 770 are typically with a PSA and/or an epoxy over a large diameter sheer area 762, 764 of each of plates 740, 760 facing the base 742 and top 770, respectively, to increase overall stiffness in motor assembly 700. Other means of attachment would work well when permitted by axial and radial spatial constraints.

One should note that in this embodiment the thrust bearing 706 may require a constant magnetic bias force pulling the hub down to maintain the precise alignment of the bearings. Again, in one embodiment, this is typically achieved by offsetting the stator (not shown) from the magnet 790, as shown in FIG. 2, or by providing a magnetic material inserted in the base 742 to generate a downward acting magnetic force between magnet 790 and the magnetic material (or by providing a separate magnet supported from the hub and cooperating with the magnetic material). Such a configuration allows lower precision tolerances on one of the two plates 740 or 760. This "floating" thrust surface facilitates alignment of the journal bearings 701, 702 and the thrust bearing 706. Moreover, it is noteworthy that the inter-shaft recirculation path helps limit shock.

Alternatively, two thrust bearings without magnetic bias may be used, but precision is then required in the grooving of the plates 740, 760 or the placement of the plates 740, 760 relative to the hub 720

Some features of the designs disclosed above include a long thrust span for better angular stiffness and a option for implementing the design using a single thrust plate with an electromagnetic bias for low power consumption and simplified manufacturing. A small diameter shaft results in lower power consumption. A top cover attachment provides better system stiffness especially since it is spread over a wide area. The single or dual radial seal options enable a long live system and a self-purging fill process which purges air bubbles that may otherwise be entrained in the fluid. The improved manufacturability includes the use of a straight shaft, simple thrust plates and PSA or similar attachment approaches. With a centrifugal sealing system, an evaporation labyrinth can be easily incorporated to minimize fluid loss. Finally, a very small form factor height is enabled to the efficient use of axial space in this design.

Thus the present invention represents a significant advancement in the field of fluid dynamic bearing design. A relatively short fluid-bearing journal gap is used in combination with a larger air-bearing thrust gap. Angular stiffness is enhanced by the larger moment arm created in the thrust gap without the need of a larger journal height or high thrust bearing power associated with large diameter liquid-lubricated thrust bearings. Thus, axial space in the journal gap is maximized for the bearings without increasing the overall axial height of the motor. Stiffness is also enhanced by attaching the shaft to the top cover.

While the foregoing is directed to embodiments of the invention, other and further embodiments of the invention may be devised without departing from the basic scope thereof, and the scope thereof is determined by the claims that follow.

What is claimed is:

1. A fluid dynamic bearing motor comprising:
   a stationary member coupled to a thrust surface extending laterally from the stationary member;
   a rotating member;
   a liquid-lubricated journal bearing disposed between opposing surfaces of the stationary member and the rotating member, wherein the liquid-lubricated journal bearing supports relative rotation of and provides radial stiffness to the rotating member; and
   a single gas lubricated thrust bearing disposed between opposing surface of the rotating member and the thrust surface, the single gas lubricated thrust bearing supporting relative rotation of and providing axial stiffness to the rotating member, wherein a moment arm of the thrust bearing is relatively greater than a moment arm of the journal bearing whereby the thrust bearing provides relatively higher angular stiffness than the journal bearing.

2. The fluid dynamic bearing motor of claim 1, wherein the stationary member comprises a shaft, and the rotary member comprises a hub supported for rotation about the shaft, and comprising a magnet and stator disposed for maintaining axial alignment of the hub and shaft.

3. The fluid dynamic bearing motor of claim 2, wherein the shaft is integrated with the thrust surface, so that a surface of the journal bearing and a surface of the thrust bearing are aligned.

4. The fluid dynamic bearing motor of claim 1, wherein the stationary member comprises a shaft and the rotary member comprises a hub supported for rotation about the shaft, wherein a first end of the shaft is coupled to the base plate and a second end is coupled to a top cover for enhanced assembly structured stiffness.

5. The fluid dynamic bearing motor of claim 1 including first and second capillary seals at either end of the journal bearing defined between a surface of the stationary member and a facing surface of the rotating member.

6. The fluid dynamic bearing motor of claim 1, wherein the stationary member comprises a shaft and the rotary member comprises a hub supported for rotation about the shaft, wherein the thrust bearing is defined between a surface of the hub and a surface of a thrust plate.

7. The fluid dynamic bearing motor of claim 6 including a vent opening extending from the thrust bearing to aid in preventing journal liquid blowout.

8. The fluid dynamic bearing motor of claim 7, wherein the vent opening extends through the hub.

9. A fluid dynamic bearing motor comprising:
   a stationary member coupled to a thrust surface extending laterally from the stationary member;
   a rotating member;
   a liquid-lubricated journal bearing disposed between opposing surfaces of the stationary member and the rotating member, the liquid-lubricated journal bearing operable to support relative rotation of and provide radial stiffness to the rotating member; and
   a single gas lubricated thrust bearing disposed between opposing surface of the rotating member and the thrust surface, the single gas lubricated thrust bearing supporting relative rotation of and providing axial stiffness to the rotating member, wherein a moment arm of the thrust bearing is relatively greater than a moment arm of the journal bearing whereby the thrust bearing provides relatively higher angular stiffness than the journal bearing, wherein the journal bearing includes a conical bearing which includes a crowned region on a surface of the journal bearing to facilitate alignment of the gaps of the journal bearing and the thrust bearing.

10. A fluid dynamic bearing motor comprising:
a stationary member coupled to a thrust surface extending laterally from the stationary member;
a rotating member;
a liquid-lubricated journal bearing disposed between opposing surfaces of the stationary member and the rotating member, the liquid-lubricated journal bearing operable to support relative rotation of and provide radial stiffness to the rotating member; and
a single gas lubricated thrust bearing disposed between opposing surface of the rotating member and the thrust surface, the single gas lubricated thrust bearing supporting relative rotation of and providing axial stiffness to the rotating member, wherein a moment arm of the thrust bearing is relatively greater than a moment arm of the journal bearing whereby the thrust bearing provides relatively higher angular stiffness than the journal bearing, wherein the stationary member comprises a shaft and the rotary member comprises a hub supported for rotation about the shaft, wherein at least a portion of the journal bearing comprises a conical bearing providing axial thrust to load the thrust bearing.

11. The fluid dynamic bearing motor of claim 10 wherein the conical bearing is a separate piece mounted on the shaft and the shaft is integrated with the base plate.

12. The fluid dynamic bearing motor of claim 10 including a magnetic bias arrangement configured to favor landing the hub on a surface of the thrust bearing or journal bearing for improved wear performance.

13. A fluid dynamic bearing motor comprising:
a stationary member coupled to a thrust surface extending laterally from the stationary member;
a rotating member;
a liquid-lubricated journal bearing disposed between opposing surfaces of the stationary member and the rotating member, the liquid-lubricated journal bearing operable to support relative rotation of and provide radial stiffness to the rotating member; and
a single gas lubricated thrust bearing disposed between opposing surface of the rotating member and the thrust surface, the single gas lubricated thrust bearing supporting relative rotation of and providing axial stiffness to the rotating member, wherein a moment arm of the thrust bearing is relatively greater than a moment arm of the journal bearing whereby the thrust bearing provides relatively higher angular stiffness than the journal bearing, wherein the journal bearing comprises a conical bearing which includes a crowned region on a surface of the journal bearing to facilitate alignment of the hub and shaft.

14. The fluid dynamic bearing motor of claim 10, wherein the shaft is a separate element from the thrust plate, and the conical bearing is integrated with the shaft, and spaced from an end of the shaft coupled to the base plate.

15. A fluid dynamic bearing motor comprising:
a stationary member coupled to a thrust surface extending laterally from the stationary
a rotating member;
a liquid-lubricated journal bearing disposed between opposing surfaces of the stationary member and the rotating member, the liquid-lubricated journal bearing operable to support relative rotation of and provide radial stiffness to the rotating member;
a single gas lubricated thrust bearing disposed between opposing surface of the rotating member and the thrust surface, the single gas lubricated thrust bearing supporting relative rotation of and providing axial stiffness to the rotating member, wherein a moment arm of the thrust bearing is relatively greater than a moment arm of the journal bearing whereby the thrust bearing provides relatively higher angular stiffness than the journal bearing,
first and second capillary seals at either end of the journal bearing defined between a surface of the stationary member and a facing surface of the rotating member; and
a fluid recirculation channel coupling the first and second capillary seals to allow air purging from the liquid journal bearing, and coupling the first and second ends of the journal bearing.

16. The fluid dynamic bearing motor of claim 15 wherein the fluid recirculation channel extends axially through the shaft inboard of the journal and thrust bearings.

17. A fluid dynamic bearing motor comprising:
a stationary member coupled to a thrust surface extending laterally from the stationary member;
a rotating member;
a liquid-lubricated journal bearing disposed between opposing surfaces of the stationary member and the rotating member, the liquid-lubricated journal bearing operable to support relative rotation of and provide radial stiffness to the rotating member; and
a single gas lubricated thrust bearing disposed between opposing surface of the rotating member and the thrust surface, the single gas lubricated thrust bearing supporting relative rotation of and providing axial stiffness to the rotating member, wherein a moment arm of the thrust bearing is greater than a moment arm of the journal bearing whereby the thrust bearing provides relatively higher angular stiffness than the journal bearing,
wherein the stationary member comprises a shaft and the rotary member comprises a hub supported for rotation about the shaft, wherein the thrust bearing is defined between a surface of the hub and a surface of a thrust plate, and
wherein the vent opening includes a channel extending laterally across a portion of a grooved thrust surface of the thrust bearing to facilitate venting pressurized air and force ambient pressure at the thrust bearing inner diameter to prevent liquid loss from the journal bearing.

18. A fluid dynamic bearing motor comprising:
a stationary member coupled to a thrust surface extending laterally from the stationary member;
a rotating member;
a liquid-lubricated journal bearing disposed between opposing surfaces of the stationary member and the rotating member, the liquid-lubricated journal bearing operable to support relative rotation of and provide radial stiffness to the rotating member; and
a single gas lubricated thrust bearing disposed between opposing surface of the rotating member and the thrust surface, the single gas lubricated thrust bearing supporting relative rotation of and providing axial stiffness to the rotating member, wherein a moment arm of the thrust bearing is greater than a moment arm of the journal bearing whereby the thrust bearing provides relatively higher angular stiffness than the journal bearing, wherein the stationary member comprises a shaft and the rotary member comprises a hub supported for rotation about the shaft, wherein the thrust bearing is defined between a surface of the hub and a surface of a thrust plate; and a wear resistant coating.

19. A fluid dynamic bearing motor comprising:

a stationary member coupled to a thrust surface extending laterally from the stationary member;

a rotating member;

a liquid-lubricated journal bearing disposed between opposing surfaces of the stationary member and the rotating member, the liquid-lubricated journal bearing operable to support relative rotation of and provide radial stiffness to the rotating member; and a single gas lubricated thrust bearing disposed between opposing surface of the rotating member and the thrust surface, the single gas lubricated thrust bearing supporting relative rotation of and providing axial stiffness to the rotating member, wherein a moment arm of the thrust bearing is greater than a moment arm of the journal bearing whereby the thrust bearing provides relatively higher angular stiffness than the journal bearing, wherein the stationary member comprises a shaft and the rotary member comprises a hub supported for rotation about the shaft, wherein the thrust bearing is defined between a surface of the hub and a surface of a thrust plate, and a thrust plate facing the hub to define the thrust bearing and supported from a base plate by a compliant self-aligning pad to facilitate journal and thrust bearing alignment.

20. A fluid dynamic bearing motor comprising:

a stationary member coupled to a thrust surface extending laterally from the stationary a rotating member;

a liquid-lubricated journal bearing disposed between opposing surfaces of the stationary member and the rotating member, the liquid-lubricated journal bearing operable to support relative rotation of and provide radial stiffness to the rotating member;

a single gas lubricated thrust bearing disposed between opposing surface of the rotating member and the thrust surface, the single gas lubricated thrust bearing supporting relative rotation of and providing axial stiffness to the rotating member, wherein a moment arm of the thrust bearing is greater than a moment arm of the journal bearing whereby the thrust bearing provides relatively higher angular stiffness than the journal bearing; and first and second capillary seals at either end of the journal bearing defined between a surface of the stationary member and a facing surface of the rotating member, wherein the thrust bearing is in communication with one of the capillary seals to serve as an oil evaporation labyrinth seal for the one of the capillary seals.

* * * * *